(12) United States Patent
Iwano

(10) Patent No.: US 7,063,331 B2
(45) Date of Patent: Jun. 20, 2006

(54) MECHANISM FOR PREVENTING INTRUSION OF WATER OR THE LIKE INTO BOOT FOR UNIVERSAL JOINT

(75) Inventor: Kazuhiro Iwano, Tochigi (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 10/238,277

(22) Filed: Sep. 10, 2002

(65) Prior Publication Data

US 2003/0102638 A1 Jun. 5, 2003

(30) Foreign Application Priority Data

Dec. 5, 2001 (JP) ............................. 2001-371924

(51) Int. Cl.
*F16J 3/04* (2006.01)
*F16D 3/84* (2006.01)

(52) U.S. Cl. .................. 277/634; 464/173; 277/928

(58) Field of Classification Search ........ 277/634–636, 277/928; 464/173–175
See application file for complete search history.

(56) References Cited

U.S. PATENT DOCUMENTS

| 3,248,955 | A | * | 5/1966 | Templeton ................ 403/50 |
| 4,210,002 | A | * | 7/1980 | Dore ...................... 464/175 |
| 4,392,838 | A |   | 7/1983 | Welschof et al. |
| 4,556,400 | A | * | 12/1985 | Krude et al. ............. 464/181 |
| 4,557,491 | A | * | 12/1985 | Orain ..................... 277/636 |
| 4,559,025 | A | * | 12/1985 | Dore ...................... 464/175 |
| 4,852,891 | A | * | 8/1989 | Sugiura et al. ............ 277/636 |
| 5,297,996 | A | * | 3/1994 | Draga ..................... 464/175 |
| 5,308,284 | A | * | 5/1994 | Renzo et al. .............. 464/175 |
| 5,672,113 | A | * | 9/1997 | Tomogami et al. ......... 464/173 |
| 5,692,962 | A | * | 12/1997 | Fukumura et al. ......... 464/173 |
| 5,725,433 | A | * | 3/1998 | Kudo et al. ............... 464/175 |
| 6,179,717 | B1 | * | 1/2001 | Schwarzler ............... 464/175 |
| 6,244,967 | B1 | * | 6/2001 | Takabe et al. ............. 464/175 |
| 6,287,040 | B1 | * | 9/2001 | Fischer .................... 403/137 |
| 6,471,595 | B1 | * | 10/2002 | Neviani .................... 464/175 |
| 6,550,350 | B1 | * | 4/2003 | Martin ..................... 74/18.2 |
| 6,820,876 | B1 | * | 11/2004 | Iwano ..................... 277/635 |

FOREIGN PATENT DOCUMENTS

| EP | 1298337 | * | 4/2003 |
| GB | 1477649 | * | 6/1977 |
| JP | 828704 |   | 2/1996 |

* cited by examiner

*Primary Examiner*—Alison K. Pickard
(74) *Attorney, Agent, or Firm*—Orum & Roth LLC

(57) ABSTRACT

A middle portion 62 of a fitting portion 52A of a boot 52 for a universal joint is fastened to a flange-like portion 72 of a member to which the boot is attached and a front end portion 63 to which communicating paths 61A to 63A of the boot 52 are opened is faced to a small diameter periphery portion 73 following one side of the flange-like portion 72 of the member to which the boot is attached.

10 Claims, 4 Drawing Sheets

MECHANISM FOR PREVENTING INTRUSION OF WATER OR THE LIKE INTO BOOT FOR UNIVERSAL JOINT

BACKGROUND OF THE INVENTION

1. Field of the Invention

The present invention relates to a mechanism for preventing intrusion of water or the like into a boot for a universal joint that is used for a propeller shaft or the like.

2. Description of the Related Art

According to a conventional vehicle, a propeller shaft for transmitting the output of an engine to a rear wheel is divided into axle directions and back and forth parts of the divided axles are coupled by a universal joint. Then, by using a boot for preventing dust and muddy water or the like from intruding in a connecting space of an outer element and an inner element of the universal joint, one end portion of the boot is fitted in the inner element of the universal joint. The other end portion thereof is fitted in the outer element of the universal joint so that the boot is attached to the universal joint.

According to the conventional art, in order to avoid the abnormal expansion and contraction and breakage of the boot due to the change of the inner pressure of the boot based on the temperature change due to the sliding frictional heat of the universal joint and the change of the inner pressure of the boot based on the sliding of the universal joint, a groove-like communicating path for adjusting an inner pressure is provided at a fitting portion against the inner element of the boot to communicate the interior of the boot with the exterior thereof (Japanese Patent Application Laid-open (JP-A) No. 8-28704).

According to the conventional art, at the fitting portion against the inner element of the boots, its end portion to which the communicating path is opened is widely exposed to the outside world. Therefore, water or the like easily intrudes into the interior of the boot from the above-described communicating path during traveling of the vehicle and at car wash facilities with high pressure. Where a large quantity of water intrudes into the interior of the boot, it is feared that a joint function fails due to rust of the universal joint or the like.

SUMMARY OF THE INVENTION

An object of the present invention is to prevent intrusion of water or the like into a boot for a universal joint from an inner pressure adjusting communication path which is opened to an end portion of a fitting portion against a member to which the boot is attached.

According to the present invention, there is disclosed a mechanism for preventing intrusion of water or the like into a boot for a universal joint boot which is provided with a communicating path to communicate an interior and an exterior of a boot with a fitting portion to a member to which the boot is attached upon when one end portion of the boot for sealing off a connecting space of the universal joint, is engaged and fitted to the member to which the boot is attached upon.

In one embodiment, a fastening portion is provided to a portion which the fitting portion of the boot butts in the member to which the boot is attached. The fitting portion of the boot is fastened to the fastening portion of the member to which the boot is attached. A front end portion at which the communication path of the fitting portion of the boot is opening is faced to a small diameter periphery portion following one side of the fastening portion of the member to which the boot is attached.

In another embodiment, a flange-like portion is provided to a portion which the fitting portion of the boot butts in the member to which the boot is attached. The fitting portion of the boot is fastened to the flange-like portion of the member to which the boot is attached. A front end portion at which the communication path of the fitting portion of the boot is opening is faced to a small diameter periphery portion following one side of the flange-like portion of the member to which the boot is attached.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

Figure 1:
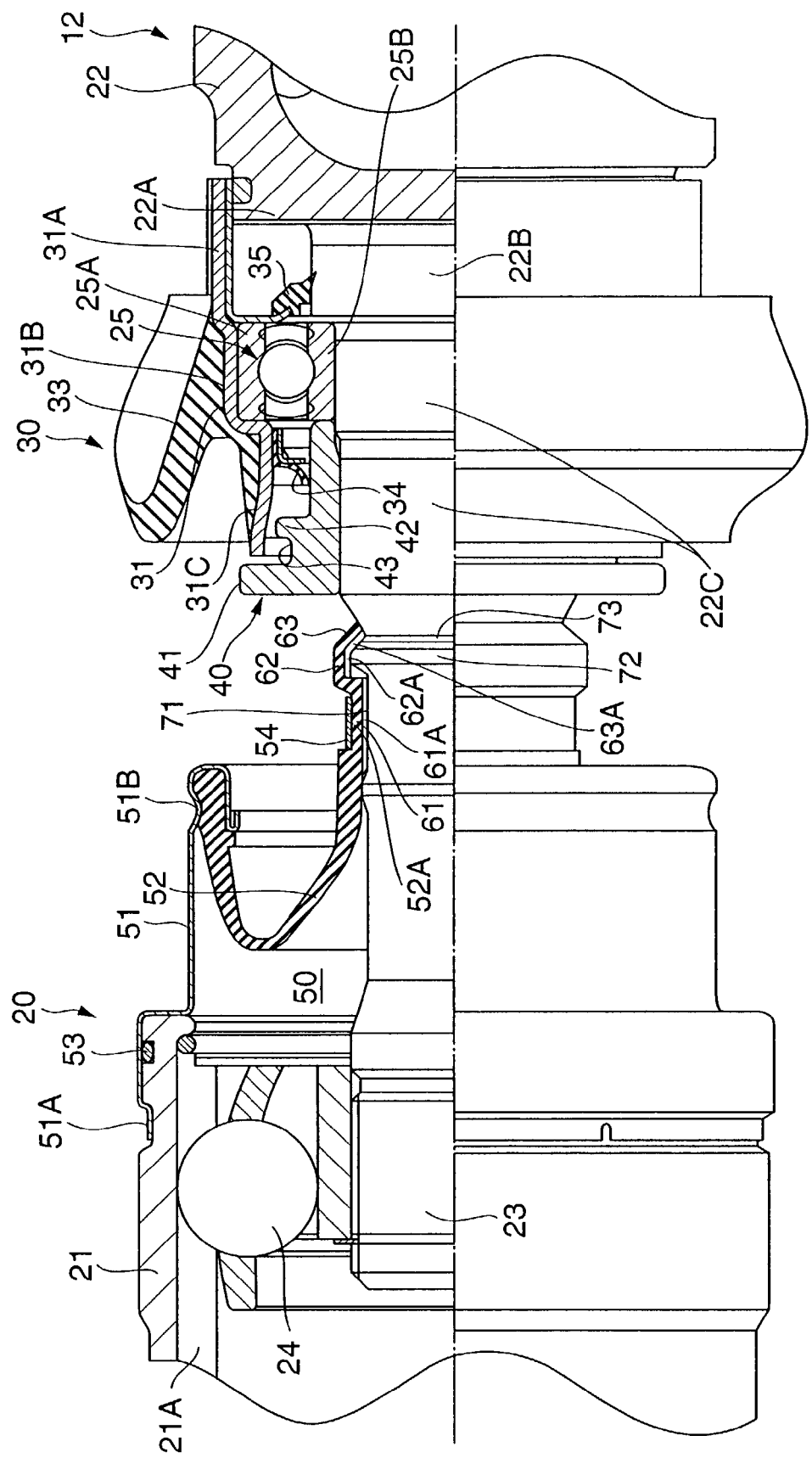
FIG. 1 is a cross sectional view showing a boot for a universal joint.

FIG. 1 shows a portion in which a first propeller shaft (not illustrated) at an engine side and a second propeller shaft 12 at a rear wheel side are coupled by a constant velocity universal joint of a DOJ type (i.e. a slidable joint) 20.

The universal joint 20 has an outer element 21 which is connected to a first propeller shaft and an inner element 23 which is formed at a front end portion of a shaft stub 22 which is connected to a second propeller shaft 12. The universal joint 20 is constructed in such a manner that a ball 24 is fitted in three grooves 21A which are disposed on three places between the outer periphery of the inner element 23 and the inner periphery of the outer element 21.

The diameter of the shaft stub 22 of the second propeller shaft 12 has been decreased by rotation from a large diameter portion 22A to the inner element 23 at the front end thereof as a middle diameter portion 22B and a small diameter portion 22C. The shaft stub 22 is rotatably supported by a circular supporting member 30 via a center bearing 25 which is mounted in the small diameter portion 22C.

The circular supporting member 30 joins an inner circle 31 and an outer circle (not illustrated) via a rubber-like elastic member 33. The inner circle 31 is formed in a tubular shape, namely, its diameter is changed as a large diameter portion 31A, a middle diameter portion 31B and a small diameter portion 31C. An outer wheel 25A of the center bearing 25 is fitted at the inner side of the middle diameter portion 31B. The large diameter portion 31A extends to a rear part covering the periphery of the large diameter portion 22A of the shaft stub 22. The small diameter portion 31C extends to a front part covering the periphery of the small diameter portion 22C of the shaft stub 22. Alternatively, in the inner circle 31, seal members 34 and 35 are mounted in the inner peripheries of the large diameter portion 31A and the small diameter portion 31C, respectively. Both seal members 34 and 35 seal the center bearing 25 from both sides. The seal member 34 is slidably connected to the periphery of a stopper piece 40 to be described later at the front face side of the center bearing 25. The seal member 35 is slidably connected to the periphery of the middle diameter portion 22B of the shaft stab 22 at the rear face side of the center bearing 25.

According to the universal joint 20, the center bearing 25 which is fitted in the inner circle 31 of the circular supporting member 30 is mounted in the small diameter portion 22C of the shaft stub 22. At this stage, a stopper piece 40 is inserted with pressure in the small diameter portion 22C of the shaft stub 22. A rear end portion of the stopper piece 40 passes through the inside of the seal member 34 to butt the front end face of the center bearing 25. Therefore, the rear end face of a inner wheel 25B of the center bearing 25 abuts against a shoulder face of the middle diameter portion 22B of the shaft stub 22 to be positioned there. The front face of the inner wheel 25B of the center bearing 25 is pressed with pressure to the rear end face of the stopper piece 40 to be positioned there.

The stopper piece 40 is provided with a large diameter flange portion 41 and a small diameter flange portion 42. The large diameter flange portion 41 of the stopper piece 40 covers the front end opening of the inner circle 31 of the circular supporting member 30 so as to prevent the direct intrusion of water into the interior of the inner circle 31 which contains the center bearing 25. Alternatively, the water which is intruded from the gap between the large diameter flange portion 41 and the inner circle 31 drops down as being guided into a circular groove 43 between the large diameter flange portion 41 and the small diameter flange portion 42 so as to prevent the water from further intruding into the interior of the inner circle 31.

Further, according to the universal joint 20, a connecting space 50 of the outer element 21 and the inner element 23 is sealed off by the use of a boot adapter 51 made of a metal thin sheet and a boot 52 made of a rubber-like elastic body. Then, grease is enclosed in this connecting space 50 in order to improve slidablity and durability of the ball 24.

In other words, a base portion 51A of the boot adapter 51 is inserted around a seal member 53 such as an O ring or the like which is disposed at the periphery of the outer element 21 to be fastened and fixed and simultaneously. A fitting portion 52A of the boot 52 disposed so as to be enfolded by a front end 51B of the boot adapter 51, is fitted on the inner element 23. The fitting portion 52A of the boot 52 and the front end 51B of the boot adapter 51 are bonded and fixed by a boot band 54.

Figure 2:
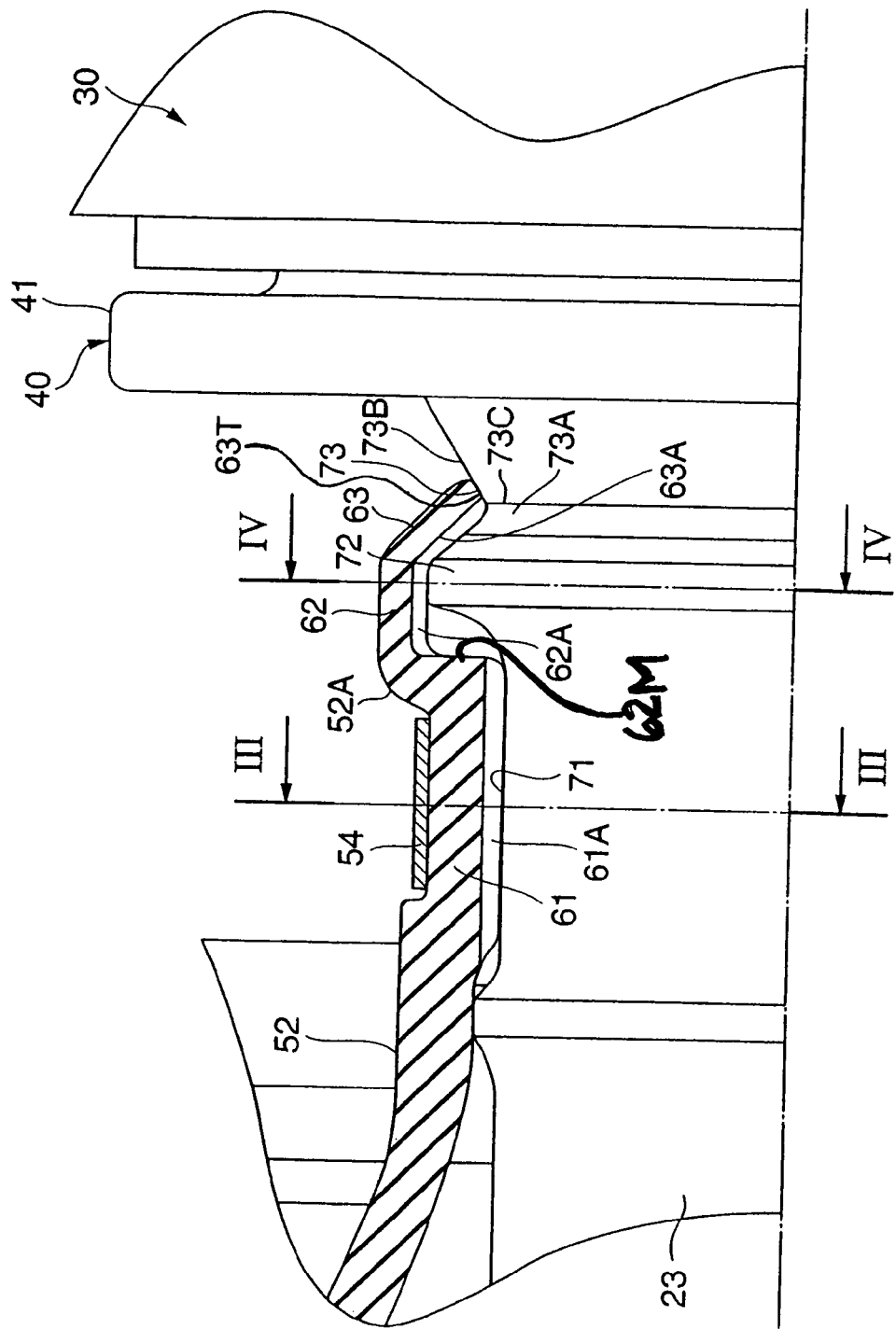
FIG. 2 is an enlarged view of substantial parts of a boot.
Figure 3:
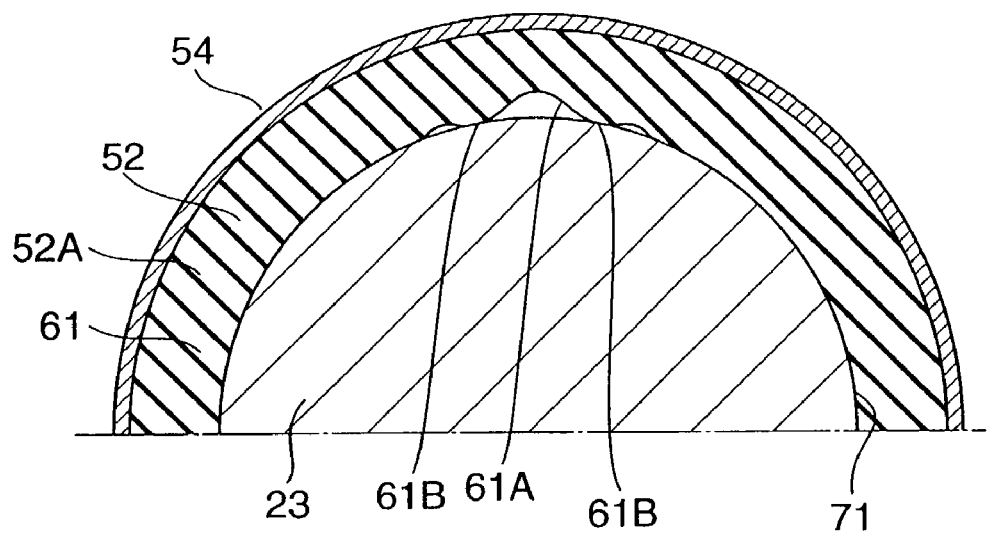
FIG. 3 is a cross sectional view along a III—III line of FIG. 2.
Figure 4:
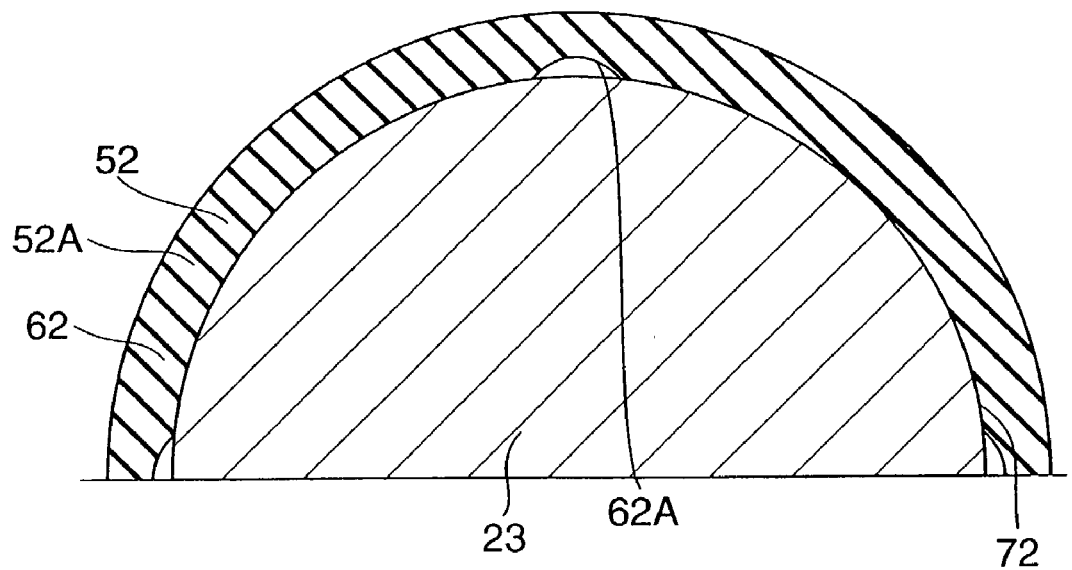
FIG. 4 is a cross sectional view along a IV—IV line of FIG. 2.

In this case, as shown in FIG. 2, the fitting portion 52A of the boot 52 consists of a base end portion 61, a middle portion 62 and a front end portion 63. A middle portion flange mating portion 62M is also provided. Groove-like communicating paths 61A to 63A for communicating the interior with the exterior of this boot 52 with air permeability are provided at not less than one positions on their inner peripheries, being elongated in an axial direction of the boot 52. According to the present embodiment, a communicating passage 61A is disposed on one position of the inner periphery of a base end portion 61 (FIG. 3). Also, a communicating passage 62A and a communicating passage 63A are disposed on four positions of the inner peripheries of a middle portion 62 and a front end portion 63, being communicated with each other (FIG. 4). Therefore, the communicating passage 63A is opened from the end face of the front end portion 63 to the outside.

Alternatively, in the inner element 23, a flange-like portion (i.e. a fastening portion) 72 which is integrally formed is provided on the middle portion in the axial direction of a portion in which the fitting portion 52A of the boot 52 is fitted. A small diameter periphery portion 73 of which diameter is smaller than that of the flange-like portion 72 is provided at the one side of the flange-like portion 72 and a small diameter periphery portion 71 of which diameter is smaller than that of the flange-like portion 72 is provided at other side of the flange-like portion 72. Further, the middle portion 62 of the boot 52 is fitted and fastened to the flange portion 72 of the inner element 23, and the front end portion 63 of the boot 52 is faced to the small periphery portion 73 at one side of the flange-like portion 72 of the inner element 23. The base end portion 61 of the boot 52 is fastened to the small diameter periphery portion 71 at the other side of the flange-like portion 72 of the inner element 23 by the boot band 54.

Therefore, in the fitting portion 52A of the boot 52 as being fitted in the inner element 23, the communicating paths 61A and 63A, which are disposed at the base end portion 61, the middle portion 62 and the front end portion 63, are arranged in the axial direction of the inner element 23 as bending along the outer shapes of the small diameter periphery portion 71, the flange-like portion 72 and the small diameter periphery portion 73. The tio face 63T of the front end portion 63 at which the communicating path 63A is opening is faced to the small periphery portion 73 of the inner element 23 to be opposed to or butt the small diameter periphery portion 73. The communicating path 63A is blocked off against the outer environment. When the front end portion 63 is opposed to or butts the small diameter periphery portion 73, the communicating path 63A may communicate with the outer environment or may not communicate with it. In the case that the communicating path 63A does not communicate with the outer environment, the front end portion 63 is turned over due to enlargement of the inner pressure of the boot 52, so that the communicating path 63A communicates with the outer environment.

According to the present embodiment, the small diameter periphery portion 73 consists of a taper portion 73A which draws apart at a downslope from the flange-like portion 72, a taper portion 73B which draws apart at a downslope from the small diameter portion 22C of the shaft stub 22 and a constriction portion 73C in which these taper portions 73A and 73B crisscross. Also, a front end face thereof to which the communicating path 63A of the front end portion 63 which opens, is opposed to or butts the constriction portion 73C.

The communicating paths 61A to 63A which are disposed on the fitting portion 52A of the boot 52 can adjust the inner pressure of the boot 52 (the connecting space 50) so as to avoid the abnormal expansion and contraction, and the breakage and the oil leakage from the inside of the boot 52, which are caused by the change of the inner pressure of the boot 52 based on the temperature change due to the sliding frictional heat of the universal joint 20, and the change of the inner pressure of the boot 52 based on the sliding of the universal joint 20.

Figure 5:
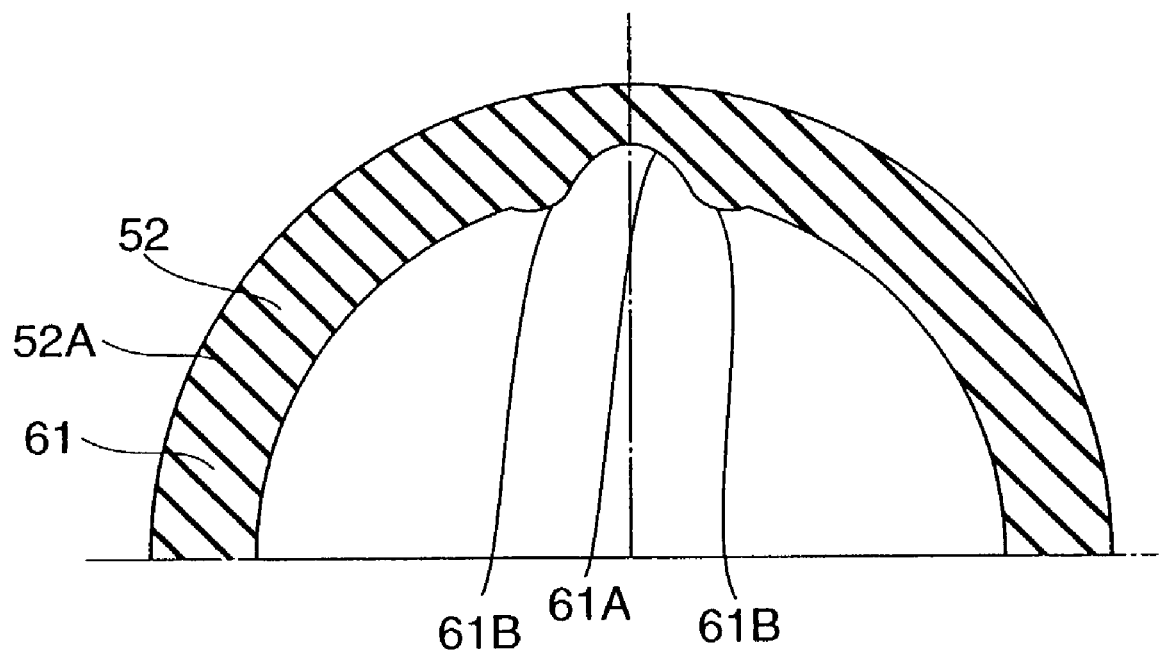
FIG. 5 is a semi cross sectional view showing a base end portion of the boot in a free condition.

Alternatively, in the fitting portion 52A of the boot 52, the base end portion 61 which is fastened by the boot band 54 is provided with the groove-like communicating path 61A as described above. It is further provided with protruding portions 61B at both sides along this communicating path 61A as shown in FIG. 5. The protruding portions 61B are disposed in streaks along the entire length of the communicating path 61A and it serves to prevent the communicating path 61A from crashing by a fastening force of the boot band 54.

According to the present embodiment, the following effects will be obtained.

(1) Being fastened to the flange-like portion (the fastening portion) 72 which is arranged in the inner element 23, the boot 52 is stably positioned as contracting the diameter of the front end portion 63 at which the communicating path 63A for adjusting the inner pressure is opening to a position facing to the small periphery portion 73 of the inner element 23. Therefore, the small periphery portion 73 of the inner element 23 blocks off the opening of the communicating path 63A of the front end portion 63 of the boot 52 from the outside world. As a result, the direct intrusion of water or the like into this communicating path 63A and the following communicating paths 61A and 62A is prevented.

(2) The middle portion 62 of the fitting portion 52A of the boot 52 is fitted in the flange-like portion 72 of the inner element 23 to be fastened thereto and the front end portion 63 of the fitting portion 52A of the boot 52 is positioned so as to be faced to the small diameter periphery portion 73 following one side of the flange-like portion 72 of the inner element 23. Therefore, the communicating paths 61A to 63A are bent at the cross section including a center axis of the boot 52. As a result, the flow channel resistance of the communicating paths 61A to 63A becomes large, so that the intrusion of water or the like is prevented.

(3) The base end portion 61 of the fitting portion 52A of the boot 52 is fastened to the small diameter periphery portion 71 following the other side of the flange-like portion 72 of the inner element 23 by the boot band 54. Accordingly, the front end portion 63, at which the communicating path 63A of the boot 52 is opening, is stably positioned to an opposed position facing the small diameter periphery portion 73 of the inner element 23 also by this boot band 54.

(4) The protruding portions 61B, 61B are arranged at the both sides along the groove-like communicating path 61A which is disposed on the inner periphery of the base end portion 61 of the fitting portion 52A of the boot 52. Therefore, the boot band 54 bears the fastening force to be given to the periphery of the communication path 61A among the fastening forces to be given to the boot 52 by the protruding portions 61B, 61B to be compressed and modified at both sides of this communication path 61A, so that the communication path 61A is not closed.

(5) By forming the flange-like portion 72 in the inner element 23, a constitution of the present invention is capable of being simplified.

As heretofore explained, embodiments of the present invention have been described in detail with reference to the drawings. However, the specific configurations of the present invention are not limited to the embodiments but those having a modification of the design within the range of the present invention are also included in the present invention. For example, the flange portion (the fastening portion) may be separated from the member to which the boot is attached to be fixed to the member to which the boot is attached by fitting or the like.

As described above, according to the present invention, by the universal joint, it is possible to prevent intrusion of water or the like from the communicating path for adjusting the inner pressure, which is opened to the front end portion of the fitting portion with respect to the member to which the boot is attached.

Although the invention has been illustrated and described with respect to several exemplary embodiments thereof, it should be understood by those skilled in the art that the foregoing and various other changes, omissions and additions may be made to the present invention without departing from the spirit and scope thereof Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A mechanism for preventing intrusion of water into a boot for a universal joint boot, comprising:
    a communicating path to communicate an interior and an exterior of a boot with an integral fitting portion to a member to which the boot is attached when one end portion of the boot for sealing off a connecting space of the adjustable joint is engaged and fitted to the member to which the boot is attached,
    a fastening portion is provided on the member at a portion of the member to which the fitting portion of the boot is mated to, said fitting portion is adapted to mate with the fastening portion and
    the fitting portion of the boot is mated to the fastening portion of the member to which the boot is attached, so that substantially all of a tip face of a front end portion of the boot at which the communication path of the fitting portion of the boot is opening abuts a taper portion following one side of the fastening portion of the member to which the boot is attached
    and in a middle portion mating portion disposed inboard from the tip face, said middle portion mating portion having a mating surface substantially perpendicular to a longitudinal axis of the boot, said middle portion mating portion arranged and constructed to mate with a correspondingly perpendicular surface on the fastening portion.

2. A mechanism for preventing intrusion of water into a boot for a universal joint according to claim 1, wherein
    the communicating path is provided on one position of the inner periphery at the base end portion of the fitting portion of the boot, and simultaneously the communicating paths are provided on four positions from a middle portion following the base portion to the inner periphery at the front end portion while being communicated with each other, so that the communicating paths are opened from the end face of the front end portion to the outside.

3. A mechanism for preventing intrusion of water into a boot for a universal joint according to claim 1, wherein
    the front end portion to which the communicating paths of the fitting portion of the boot are opened is faced to the small diameter periphery portion of the member to which the boot is attached as being opposed thereto or abutting it, so that the communicating paths are blocked off against the outer world.

4. A mechanism for preventing intrusion of water into a boot for a universal joint boot, comprising:
    a communicating path to communicate an interior and an exterior of a boot with a an integral fitting portion to a member to which the boot is attached upon when one end portion of the boot for sealing off a connecting space of the adjustable joint is engaged and fitted to the member to which the boot is attached upon, and
    a flange-like portion is provided on the member at a portion of the member to which the fitting portion of the boot is mated, said fitting portion is adapted to mate with the flange-like portion, and the fitting portion of the boot is mated to the flange-like portion of the member to which the boot is attached, so that substantially all of a tip face of a front end portion of the boot at which the communication path of the fitting portion of the boot is opening is abuts a taper portion following one side of the flange-like portion of the member to which the boot is attached and a middle portion flange mating portion disposed inboard from the tip face, said middle portion flange mating surface substantially perpendicular to a longitudinal axis of the boot, said middle portion flange mating portion arranged to mate with a correspondingly perpendicular surface of the flange like portion.

5. A mechanism for preventing intrusion of water into a boot for a universal joint according to claim 2, wherein the flange-like portion is integrally formed on the member to which the boot is attached.

6. A mechanism for preventing intrusion of water into a boot for a universal joint according to claim 4, wherein a base end portion of the fitting portion of the boot is fastened by the boot band to a small diameter portion following the other side of the flange-like portion of the member to which the boot is attached.

7. A mechanism for preventing intrusion of water into a boot for a universal joint according to claim 6, wherein a groove-like communicating path is provided at an inner periphery of the base end portion of the fitting portion of the boot and protruding portions are provided at both sides along the communicating path at the inner periphery.

8. A mechanism for preventing intrusion of water into a boot for a universal joint according to claim 7, wherein the flange-like portion is integrally formed on the member to which the boot is attached.

9. A mechanism for preventing intrusion of water into a boot for a universal joint boot according to claim 7, wherein the protruding portions are provided across an entire length of the communicating paths in streaks.

10. A mechanism for preventing intrusion of water into a boot for a universal joint according to claim 6, wherein the flange-like portion is integrally formed on the member to which the boot is attached.

* * * * *